United States Patent [19]

Young

[11] 3,762,450
[45] Oct. 2, 1973

[54] ECOLOGICAL HANDLING OF VOLATILE LIQUIDS

[75] Inventor: Donald C. Young, Fullerton, Calif.

[73] Assignee: Union Oil Company, Los Angeles, Calif.

[22] Filed: July 29, 1971

[21] Appl. No.: 167,494

[52] U.S. Cl. .................................. 141/5, 141/49
[51] Int. Cl. ........ B65b 37/20, B67c 3/30, B67d 5/06
[58] Field of Search ..................... 141/4, 5, 9, 10, 141/49

[56] References Cited
UNITED STATES PATENTS

| | | | |
|---|---|---|---|
| 3,613,746 | 11/1971 | Smith | 141/5 |
| 3,636,992 | 1/1972 | Weidner | 141/4 |
| 1,626,213 | 4/1927 | Stenkvist | 141/5 |
| 3,653,414 | 4/1972 | Weidner | 141/4 |
| 3,344,656 | 10/1967 | VanHorne | 141/5 X |
| 676,366 | 6/1901 | Koch | 141/37 |
| 2,727,665 | 12/1955 | Charney | 141/37 X |

*Primary Examiner*—Wayne A. Morse, Jr.
*Attorney*—Milton W. Lee et al.

[57] ABSTRACT

A method is disclosed for reducing the emission of volatile constituents from vessels being filled with a liquid solution containing the volatile constituent. In the method, the vessel is initially purged with a condensable vapor to displace any non-condensable gases in the vapor space of the vessel and thereafter while filling the vessel with the liquid solution introducing additional amounts of the vapor into the vapor space at a rate sufficient to prevent the pressure differential between the interior and exterior of the vessel from exceeding the vessel safety limits. The condensable vapor is capable of condensing at temperature and pressure conditions existent within the vessel during filling.

10 Claims, No Drawings

ECOLOGICAL HANDLING OF VOLATILE LIQUIDS

DESCRIPTION OF THE INVENTION

This invention relates to a method for reducing the emission of atmospheric contaminants from vessels, and more particularly, to a method for reducing the emission of volatile contaminants from vessels being filled with solutions containing the contaminants. The method of this invention has particular application to the reduction of ammonia emission from vessels which are being charged with aqueous ammonia solutions.

BACKGROUND OF THE INVENTION

The continued rate of industrialization of the developed countries as well as their increasing and widespread use of fertilizers in agronomy has recently focused attention on pollution of the ecology and, particularly, on air pollution. The filling of storage vessels with solutions containing volatile constituents invariably results in the loss of some of the volatile constituents by evaporation into the vapor space of the vessels and ensuing displacement from the tanks as they are filled with the liquid solution. Immobile storage vessels which are frequently filled and emptied are often permanently vented to vapor treatment facilities to prevent the undesired discharge of volatilized contaminants into the atmosphere. Many vessels, however, are filled too infrequently or are too remote to warrant the expense of a permanent recovery facility. The problem is particularly acute in the filling of transport vessels and, particularly, vessels on marine craft, since these vessels are difficult to connect to permanent vapor treatment facilities because of the remoteness of the loading sites and the variation in sizes and shapes of the vessels and their vent facilities. As a result, the filling of these tanks often results in undesired, and heretofore unprevented, discharge of vaporous products into the atmosphere.

The total amount of vaporous product vented to the atmosphere during filling of a vessel is low and represents a loss of product which, for the most part, is too insignificant to justify the cost of installing permanent vapor treatment facilities. The concentration of the vaporous product in the gaseous effluent from a vessel, on the other hand, can be quite high, constituting several volume percent of this effluent. This high concentration can present a pollution problem in the immediate environment of the vessel and substantial dilution of the effluent may be necessary so that its presence does not become objectionable. This pollution is particularly acute in the loading of aqua-ammonia in storage and transport vessels and the ensuing discharge of vaporous ammonia to the atmosphere since the threshold of ammonia detection in humans is about 50 parts per million. As a consequence, many United States ports have enacted air pollution control regulations requiring the merchant vessels to either load aqua-ammonia at night or take appropriate measures to reduce the total ammonia emissions.

The cost of permanent treatment facilities to recover volatilized products from a vessel's effluent vapors, even when amortized over the life of the facilities, is generally greater than the value of the recovered product and accordingly any recovery method must not require a large capital investment and must be operable with a minimum of expense.

It is, therefore, an object of this invention to provide a method for reducing the emission of volatilized constituents from vessels which are being filled with solutions containing the volatile constituents.

It is another object of this invention to provide a method for reducing emission of volatilized constituents from vessels on marine craft which are being filled with a solution containing the volatile constituents.

Another object of this invention is to provide a method for reducing the emission of ammonia from vessels as they are being filled with aqueous solutions of ammonia.

Other and related objects of this invention will become apparent from the following description of the invention and appended claims.

SUMMARY OF THE INVENTION

The aforegoing objects and their attendant advantages can be realized by purging the vessel prior to its filling to displace the noncondensable gases from the vessel's vapor space. The purging is accomplished by passing a vapor, which is condensable at the temperature and pressure conditions within the vessel during its filling, through the vapor space of the vessel at a sufficient rate and volume so that the noncondensable gases are substantially displaced from the vapor space and replaced with at least 80 volume percent of the condensable vapor. A liquid solution containing a volatile constituent is charged into the vessel and simultaneously therewith additional amounts of the same or a similar condensable vapor are introduced into the vapor space at a rate sufficient to prevent the pressure differential between the interior and exterior of the vessel from exceeding the safety limits for the vessel. By filling the vessel in this manner the displaced volume resulting from the rising liquid level is offset by reduction of the vapor volume resulting from the condensation of the condensable vapor. Thus, there is little, if any, vapor effluent discharged from the vessel while it is being filled.

It is essential that a major portion of the vapor space of the vessel be purged of gases which are not condensable under conditions encountered during filling. If these gases are not removed prior to filling, a gradual build-up of pressure within the vessel will occur upon the rising liquid level. If pressurized systems can not be tolerated, then the gases within the vessel will have to be vented. It is this venting and ensuring discharge of volatilized constituents from the vessel which is sought to be avoided by the practice of this invention.

The purging can be accomplished by any procedure which allows efficient displacement of the noncondensable gases. In a typical procedure, a vapor discharge port in the vessel is opened and an excess of condensable vapor is injected into the vessel through an injection port, preferably located at the opposite end of the vessel from the discharge port. The vapor injection is continued until the vapor space contains less than 20 volume percent and preferably less than 10 volume percent of noncondensable gases (usually air). Generally, the amount of vapor required to sweep the vessel of the noncondensable gases where the discharge and injection ports are located on opposite ends of the vessel ranges from about 20 to about 10 standard cubic feet of vapor per cubic foot of vapor space.

In instances where the residual noncondensable gases within the vessel and the purging condensable vapors do not pose a serious atmospheric pollution problem, such as air, steam, etc., the vapor discharge port is simply vented to the atmosphere. However, in instances where either the residual noncondensable gases or the purging vapors contain or comprise highly noxious or dangerous vapors, the vapor discharge port is preferably connected to a vapor recovery facility, such as a small adsorption tower or similar device, to avoid discharge of such vapors to the atmosphere.

After the vessel has been purged, the outlets, such as the vapor discharge ports and any fluid exit conduits, are closed, and the liquid solution containing the volatile constituent is pumped into the vessel. Simultaneously therewith, the condensable vapor is introduced into the vapor space at the top of the vessel. The vapor injection rate is dependent on the amount of vapor space, the type of vapor employed, the miscibility of the vapor condensate in the solution and the flow rate of solution into the vessel. This rate, however, must be sufficient to prevent the pressure within the vessel from becoming too low so as to prevent the vessel walls from collapsing. Generally, the rate can be controlled in response to the vessel pressure. Although the pressure within the vessel may drop slightly due to the condensation of the incoming vapor, the rate of vapor injection can be maintained so that the pressure does not decrease below about 90 percent of desired vessel pressure during filling.

While the injection rate varies for each system, the total amount of condensable vapor injected into the vessel, generally ranges from about 1 to 10 standard cubic feet per cubic foot of vapor space and preferably from about 1 to 5 standard cubic feet per cubic foot of vapor space. In instances where greater than about 20 standard cubic feet of condensable vapor per cubic foot of vapor space is necessary in order to maintain the pressure within the vessel greater than 90 percent of the desired pressure, it is preferred that another condensable vapor be employed which has a lower vapor pressure.

At the termination of the vessel loading, the supply of the condensable vapor is shut off. With transport vessels, the line connecting the condensable vapor source to the vessel is removed and the gas injection port or ports are closed. When the liquid solution reaches its destination and the vessel is unloaded, a condensable vapor source may again be connected to the injection port and vapor introduced into the vessel during the unloading. In this manner the intrusion of noncondensable gases into the vessel and the subsequent vessel purging can be avoided or at least diminished.

The condensable vapors which can be employed in the practice of the instant invention can comprise any vapor which has a vapor pressure less than the vapor pressure of the volatile constituent and which is condensable at or above the expected temperature and/or at or below the expected pressure of the vessel during its filling. Preferably the vapor pressure of the condensable vapor is from 0.1 to 75 percent and more preferably from 0.1 to 10 percent of the vapor pressure of the volatile constituent and condenses at a temperature of from 5° to 100° C and more preferably from 10° to 50° C above the temperature of the vessel during filling at the vessel pressure.

The condensable vapor should also be relatively inert to the metallic parts of the vessel and stable under the conditions encountered during filling. Preferably, the vapor is less objectionable as an atmospheric pollutant than the volatile constituent, however, since the vapor condenses within the vessel during filling little if any of the vapor escapes to the atmosphere. The particularly preferred condensable vapors are selected from those naturally existent in the atmosphere such as, water, carbon dioxide, etc. The release of these gases to the atmosphere, such as may occur during vessel purging, presents little if any hazard to the ecology, and thus use is especially recommended in the handling of large bulk quantities of the liquid solutions.

In addition to providing a means for reducing the vapor volume by condensation, the condensable vapor may also be an extractant for volatilize constituents inevitably released into the vapor space during filling. In this embodiment, the condensing vapor forms small droplets of condensate which settle from the vapor space to the liquid surface of the solution. These droplets absorb a portion of any volatilized constituents in the vapor space and carry them back to the solution. Thus, in this embodiment the condensable vapor functions both as an extractant and as a means for reducing the vapor volume during filling. The vapors which possess this dual functioning ability have condensates which have a high solubility for the volatile constituent. Thus, in this embodiment it is preferred to select a vapor condensate which is also the solvent for the volatile constituent. For example, where aqueous solutions are encountered, steam is the preferred vapor since the water condensate is a solvent for the volatile constituent and its presence does not contaminate the liquid solution. In the most typical application, ammonia is the volatile constituent and water is the preferred condensable vapor since it is capable of reducing the vapor volume by condensation and also has a high solubility for the volatilized ammonia.

It is recognized, however, that the condensate of the condensable vapor can possess little solubility for the volatile constituent and still be successfully employed in the practice of this invention. In fact, it may in some instances be advantageous to employ a condensable vapor having a condensate which is immiscible in the liquid solution, since in these instances, the condensate may be readily removed from the solution upon completion of the filling operation. In this manner adulteration of the solution with condensate may be conveniently avoided.

Exemplary condensable vapors include stable inorganic gases such as water, carbon dioxide, nitrous oxide, xenon, etc.; halogenated hydrocarbons, such as dichlorodiflouro methane, dichloroflouro methane, triflourodichloro ethane, etc.; aliphatic hydrocarbons, such as propane, butane, isobutylene, octane, 1,3 dipropyl hexane, etc.; alicyclic hydrocarbons such as cyclopentane, cyclohexane, propyl cyclohexane, etc.; aromatic hydrocarbons, such as benzene, toluene, xylene, napthalene, etc.; as well as the oxidized hydrocarbons such as aliphatic, alicyclic and aromatic alcohols, like ethanol, propanol, cyclohexanol, benzyl alcohol, etc.; esters such as, butyl acetate, cyclopentyl propionate benzyl acetate, etc.; ketones, such as, butanane, 2,3-dimethyl hexanone-3, cyclopentanone, benzophenone, etc.; aldehydes, such as, ethanol, butanol, cyclopropanol, $\beta$-Naphthaldehyde, etc.; and acids, such as, acetic acid, adiphic acid, $\alpha$-Bromopropionic acid, benzoic acid, etc. Many of the above compounds may react or form a complex with the liquid solution within the vessel, and, in instances where such is undesirable it is preferred to select a condensable vapor which is inert to the liquid solution and the volatile constituents. Isobutylene, for example, will react with concentrated sulfuric acid and in instances where fuming sulfuric acid is the liquid solution, an inert hydrocarbon such as butane, etc., is preferred over the unsaturated hydrocarbons.

The liquid solution containing the volatile constituent can be any commercially transported solution containing a volatile air contaminate. Exemplary liquid solutions include volatile aqueous acids such as, hydrochloric, nitric, sulfuric and phosphoric acids; aqueous ammonia solutions; and volatile hydrocarbon solutions, such as gasoline, diesel oil, propane, butane, pentane, etc.

The method and practice of this invention has particular application to the reduction of emissions from storage vessels on board marine craft, and particularly those vessels being filled with aqua-ammonia. In this application the empty vessels can be easily purged by attaching a steam line to an injection port at the top of the vessel and injecting steam therein while venting the effluent to the atmosphere. When at least 80 percent of the residual air in the vessel has been evacuated, aqua-ammonia is charged to the vessel through the loading conduits. Steam is injected into the vessel at a rate sufficient to maintain the pressure within the vessel between about 0.9 and 1.2 pounds per square inch. As the liquid level in the storage tank rises, the injection rate of steam into the vapor space is slowly decreased at a rate sufficient to maintain the pressure within the vessel constant. At the end of the filling, the steam line is disconnected from the vessel and the injection port is closed.

The invention is further illustrated by the following examples which are illustrative of specific modes of practice of this invention and which are not intended as limiting the scope of the invention as defined by the appended claims.

EXAMPLE 1

This example is presented to demonstrate the effectiveness of a condensable vapor to reduce the emission of vapors from a vessel being filled with a volatile liquid solution.

A 2-liter glass Erlenmeyer flask is fitted with a stopper through which extends a thermometer and two glass tubes, one having an inlet line leading to the bottom of the flask, and the other an outlet line leading to the top of the flask. Each line is equipped with a glass cock. A pressure gauge is fitted on the outlet line ahead of the outlet cock. The outlet cock is opened, steam at a temperature of about 212° F is passed through the flask at a rate of about four liters per minute. After approximately 1 minute, at which time the flask temperature is about 212° F, and the pressure atmospheric, a sample of the outlet gas is taken, the steam flow is discontinued, both cocks are closed, and one liter of 24 weight percent aqua-ammonia at ambient temperature is introduced into the flask through the inlet line at a rate of about 1 liter per minute. During this period, the temperature in the flask drops to substantially ambient temperature, and the pressure drops below atmospheric and then slowly rises to atmospheric. Analysis of the gas sample indicates that less than 5 percent air remained in the flask prior to being charged with the aqua-ammonia.

For comparison, the procedure is repeated except that no steam is passed through the flask. The contents of the flask comprise, of course, pure air. The aqua-ammonia solution is charged to the flask and the pressure gradually increases. Simultaneous with the charging of the aqua-ammonia solution the stop cock on the outlet line is opened to prevent further increases in the gas pressure, and effluent gas is vented. Approximately 1 liter of effluent gas is vented having an ammonia vapor concentration varying from 0 volume percent upon initial venting and rising to greater than 50,000 ppm at the end of the venting period.

It is thus apparent from the above example that the introduction of steam to the system resulted in no discharge of ammonia vapors to the atmosphere while maintaining the flask pressure at atmospheric.

EXAMPLE 2

This example demonstrates the practice of the invention in the filling of storage vessels onboard marine craft. An adapter having two 3-inch diameter inlet lines if fitted over a butterworth opening at one end of an empty 9,000 barrel storage tank onboard a small marine barge. A second butterworth opening is opened to the atmosphere at the opposite end of the storage tank to provide a means for venting the tank to the atmosphere. Two 3-inch diameter steam lines are connected to the two inlet lines and steam is injected into the tank at a rate of 4,000 standard cubic foot per minute for 15 minutes. At the end of the 15 minute period, aqua-ammonia containing approximately 27.5 weight percent ammonia is charged to the tank at approximately 1,000 barrels per hour. The open butterworth opening is closed and the rate of steam injected into the tank is adjusted so that the tank pressure is maintained at approximately 0.9 psig. The amount of steam injected into the tank is continuously decreased during the filling in order to maintain the pressure constant. At the end of the filling period, approximately 8-¾ hours, the pressure in the vessel is still at atmospheric and no effluent vapors are discharged to the atmosphere.

The preceding examples are presented solely to illustrate the preferred mode of practicing this invention and to demonstrate the results attained therewith. It is not intended that the examples be construed as unduly limiting the invention but instead it is intended that the invention include only the various restrictions set forth in the following claims.

I claim:

1. In the handling and storage of multi-barrel quantities of a solution containing a volatile constituent which has an appreciable volatility at the conditions of temperature and pressure encountered during said handling and storing wherein said solution is introduced into a metal vessel of multi-barrel capacity having sidewalls capable of withstanding only a limited partial vacuum containing noncondensible gases and equipped with a vapor discharge port operative to vent displaced vapor therefrom during its filling, the improved method for preventing the escape of volatilized amounts of said volatile constituent from the vapor discharge port during filling of the vessel which comprises:

1. displacing at least 80 percent of the noncondensible gases through the vapor discharge port thereof prior to introduction of said solution into said vessel by introducing into said vapor space a sufficient volume of a condensible vapor which will condense at pressure and temperature conditions within the vessel during filling;

2. closing the vapor discharge port; and
3. thereafter introducing said solution into said vessel while maintaining said vapor discharge port closed and while preventing collapsing of the walls of said vessel by continuing to introduce said condensible vapor into said vapor space and controlling the rate of introduction thereof during the period of introducing of said solution to prevent the formation of a vacuum within said metal vessel which exceeds said limited partial vacuum.

2. The method defined in claim 1 wherein said condensable vapor has a vapor pressure between about 0.01 and 75 percent of the vapor pressure of the volatile constituent of said solution.

3. The method defined in claim 1 wherein said condensable vapor has a condensate which is miscible in said solution.

4. The method defined in claim 1 wherein said vessel is used in the transportation of said solution.

5. The method defined in claim 4 wherein said vessel is onboard a marine craft.

6. The method defined in claim 1 wherein said solution is aqua-ammonia.

7. The method defined in claim 6 wherein said condensable vapor is steam.

8. The method of claim 6 wherein said solution contains about 27.5 weight percent ammonia.

9. The method of claim 1 wherein said vessel is a storage vessel for storage of solution at atmospheric pressure.

10. The method of claim 1 wherein said vapor condenses into a condensate which is immiscible in said solution.

* * * * *